United States Patent [19]
Northcut et al.

[11] Patent Number: 6,027,647
[45] Date of Patent: Feb. 22, 2000

[54] MULTI-ELEMENT LIQUID FILTER SYSTEM WITH FLUSHING AND FILTERING CIRCUITS

[76] Inventors: Donald A. Northcut; Douglas W. Northcut, both of 14041 SW. 320 St., Homestead, Fla. 33030

[21] Appl. No.: 09/081,554

[22] Filed: May 20, 1998

[51] Int. Cl.[7] .......................... B01D 27/08; B01D 27/14; B01D 25/02; B01D 29/56
[52] U.S. Cl. ...................... 210/323.2; 210/332; 210/335; 210/444; 210/453; 210/455
[58] Field of Search ..................................... 210/252, 259, 210/300, 301, 323.2, 332, 335, 440, 443, 444, 453, 422, 409, 411, 312, 333.01, 323.1, 455

[56] References Cited

U.S. PATENT DOCUMENTS

| | | |
|---|---|---|
| 30,366 | 10/1860 | Warne . |
| 136,364 | 3/1873 | Conger . |
| 159,364 | 2/1875 | Snider . |
| 273,539 | 3/1883 | Hyatt . |
| 671,684 | 4/1901 | Xander . |
| 3,780,869 | 12/1973 | Krongos . |
| 4,476,015 | 10/1984 | Schmitt et al. . |
| 4,944,875 | 7/1990 | Gaignet . |
| 5,178,758 | 1/1993 | Hwang . |
| 5,401,397 | 3/1995 | Moorehead . |
| 5,462,653 | 10/1995 | Hills . |
| 5,510,027 | 4/1996 | Tejeda . |
| 5,562,824 | 10/1996 | Magnuson . |
| 5,573,665 | 11/1996 | Frommer et al. . |
| 5,695,636 | 12/1997 | Gullett . |
| 5,705,065 | 1/1998 | Sharpe . |

*Primary Examiner*—Matthew O. Savage
*Assistant Examiner*—A Schwartz
*Attorney, Agent, or Firm*—Terrance L. Siemens

[57] ABSTRACT

A filter housing assuring serial filtration of a liquid through plural filter cartridges and enabling flushing without requiring removal of the filter cartridges. The filter housing has a cap including a liquid inlet, a filtered liquid outlet, a flush liquid outlet, and internal passages. The filter cartridges are held within a canister which is pressed against the cap and constrained against rotation with the cap. A retaining member surrounding and bearing against the canister threads to the cap. The canister is divided into chambers, and has passages in its floor arranged to enable serial transfer of liquid from one chamber to the next. Flushing employs liquid introduced under normal pressure. Passages leading to the flush liquid outlet enable flushing to proceed when the flush liquid outlet is opened. At other times, filtered liquid will pass through passages leading to the filtered liquid outlet. Liquid is circulated to assure filtration even when flushing, so that contamination of filtered liquid is precluded.

5 Claims, 7 Drawing Sheets

MULTI-ELEMENT LIQUID FILTER SYSTEM WITH FLUSHING AND FILTERING CIRCUITS

BACKGROUND OF THE INVENTION

1. Field of the Invention

The present invention relates to filters, and more particularly to a filter housing which accepts plural replaceable filter elements to be contained within a single housing. The filter elements are disposed in series for filtering purposes. The housing accommodates flushing without requiring removal of the filter elements.

2. Description of the Prior Art

In light of many contaminants which may become entrained in water supplied by domestic plumbing systems, it is desirable to filter the water prior to employing the same for human consumption. Many filters are commercial products featuring filter cartridges which are readily installed and serviced by residential occupants who may lack specialized skills of a plumber. These filters conventionally comprise housings which enclose one or more filtering elements. Consequently, separate replaceable filtering elements are readily available from commercial sources.

A filter seen in U.S. Pat. No. 3,780,869, issued to Zaharias Krongos on Dec. 25, 1973, has a housing formed in two threadably mating parts, which housing encloses plural replaceable filter elements. The filter of Krongos lacks the flushing circuitry, serial filtration circuitry, and inlet and outlet arrangement of the present invention.

U.S. Pat. No. 30,366, issued to M. W. Warne on Oct. 9, 1860, shows a vessel having plural compartments each containing filtration material and connected in series. The device of Warne lacks the flushing circuitry, inlet and outlet arrangement of the present invention, readily replaceable filter cartridges capable of holding their form without supporting, surrounding walls, and adjustable compression of such filter cartridges, all being features of the present invention.

U.S. Pat. No. 136,364, issued to Walter M. Conger on Mar. 4, 1873, illustrates a filter having filter elements disposed in series and also flushing circuitry. However, the device of Conger lacks the threaded, separable, two part housing of the present invention, flushing circuitry contained within a part of the housing, adjustable compression of filter cartridges elements, and the inlet and outlet arrangement, and internal flow scheme of the present invention.

None of the above inventions and patents, taken either singly or in combination, is seen to describe the instant invention as claimed.

SUMMARY OF THE INVENTION

The present invention provides a readily installed and serviced filter apparatus which employs readily available filter cartridges and which further enables ready flushing. The novel filter apparatus includes a threaded, two part housing which can be opened to expose the plural filter cartridges without interrupting liquid connections. The housing includes an inner canister which is adjustably compressed by a bolt accessible from the exterior of the filter, to secure filter cartridges by compression. The filter has one threaded inlet and two threaded outlets, one outlet for filtered water and the other to discharge waste when flushing.

The filter apparatus accepts a plurality of filter cartridges. Internal liquid flow circuitry passes water serially through the several cartridges. This ability may be exploited to subject all water to filters designed to trap different contaminants. The filter can be flushed automatically or with minimal difficulty, in particular requiring neither removal of the filter cartridges nor disassembly from the domestic plumbing system. The filter is configured to assure that water employed for flushing will not be discharged in common with filtered water.

Accordingly, it is one object of the invention to provide a water filter readily connectable to a domestic plumbing system.

It is another object of the invention to provide a water filter which accepts plural filter elements.

It is a further object of the invention that the filter employ commercially available filter cartridges.

Still another object of the invention is to enable flushing without requiring removal of filter elements.

Yet another object of the invention is to prevent water employed to flush the filter to be discharged in common with filtered water.

An additional object of the invention is to provide a filter housing which opens to expose filter elements without requiring disassembly from the domestic plumbing system.

It is again an object of the invention to enable compression of the housing to secure filter cartridges.

Yet another object of the invention is to provide serial flow through plural filter cartridges.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
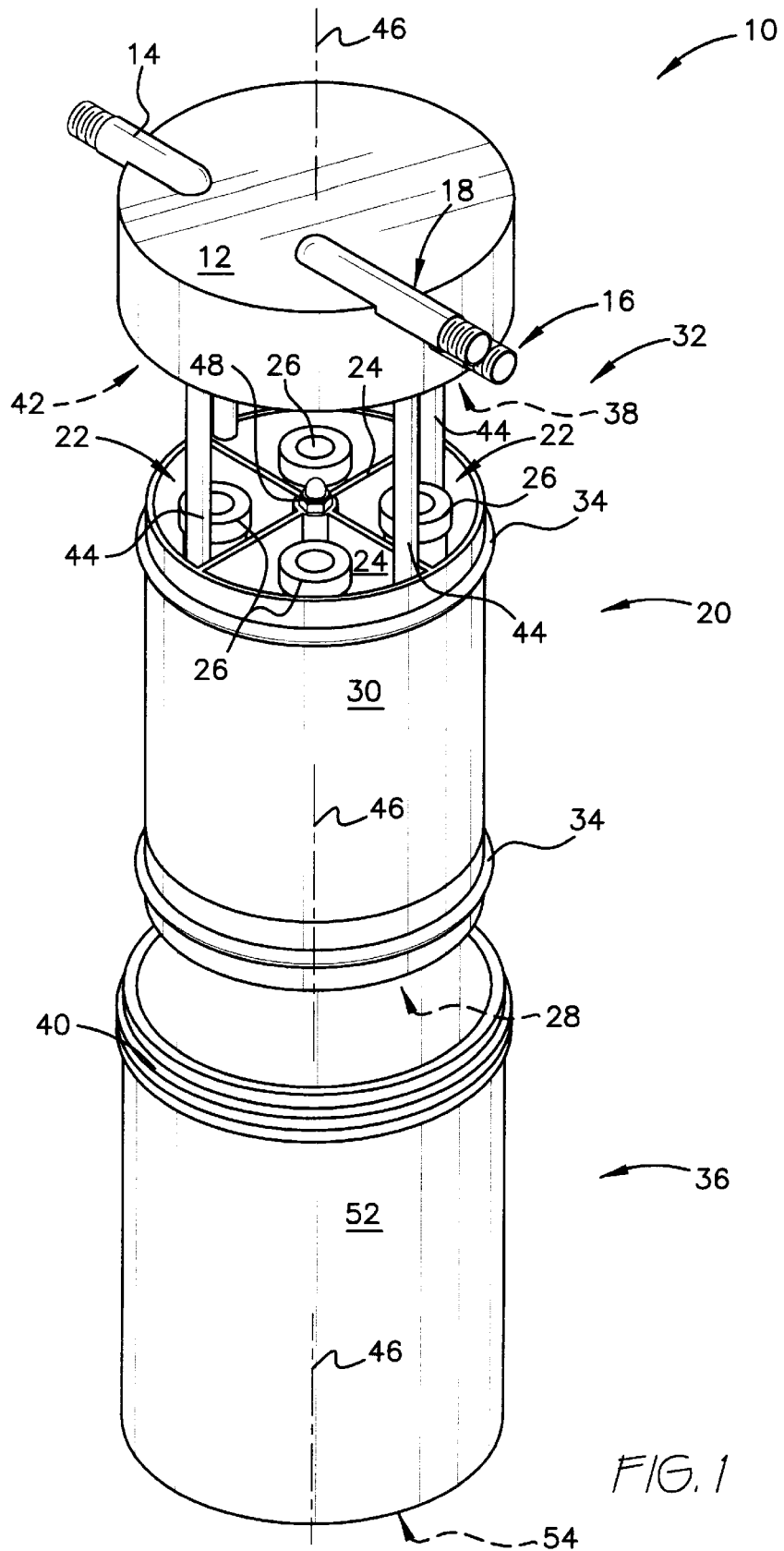
FIG. 1 is an exploded, perspective view of the invention.

Turning now to FIG. 1 of the drawings, novel multi-element filter housing 10 is seen to comprise a cap 12 having an inlet 14, a first outlet 16 for discharging flushing liquid, and a second outlet 18 for discharging filtered liquid. A canister 20 divided into four separated chambers 22 by four internal walls 24 contains one filter cartridge 26 in each chamber 22. Filter cartridges 26 are annular, open at the top and at the bottom, and are conventional, commercially available products. Filter cartridges 26 may differ in their filtration characteristics despite similar dimensions and configuration. Canister 20 has a solid or continuous bottom 28, a peripheral wall 30, and an open top 32. Bottom 28 and wall 30 are continuous, so as to retain liquid within canister 20. Circumferential grooves (see FIG. 5) formed towards the top and bottom of canister 20 are provided to seat O-rings 34.

A retainer 36 holds canister 20 against the bottom surface 38 of cap 12 when secured to cap 12. Retainer 36 has male threads 40 which mate with female threads 42 formed in cap 12. Threading retainer 36 to cap 12 squeezes or pins canister 20 against cap 12. Canister 20 is dimensioned and configured such that both canister 20 and filter cartridges 26 come to abut cap 12 simultaneously when canister 20 is threaded to cap 12. Vertically disposed pick up tubes 44, the purpose of which will be explained hereinafter, depend from bottom surface 38 of cap 12, and are configured and located to project into chambers 22 without interfering with filter cartridges 26. Pick up tubes 44 each are dimensioned and configured to terminate proximate bottom 28 of canister 20 when canister 20 abuts cap 12. Each pick up tube 44 is also configured and located to project into its one corresponding chamber 22 of canister 20.

Position of canister 20 relative to cap 12 is critical to alignment of fluid conduits. Consequently, canister 20 may not rotate about axis 46. Nub 48, which also serves to align canister 20 concentrically with respect to cap 12, is configured other than circular in cross section, so that it acts as a keying element constraining canister 20 and cap 12 against mutual rotation. Nub 48 fits into a correspondingly configured recess 50 (see FIG. 5) formed in cap 12.

Retainer 36 has a continuous annular wall 52 and a continuous floor 54, and thus surrounds and seals canister 20 between cap 12 and retainer 36 when retainer 36 is tightened and fully engages cap 12.

Figure 2:
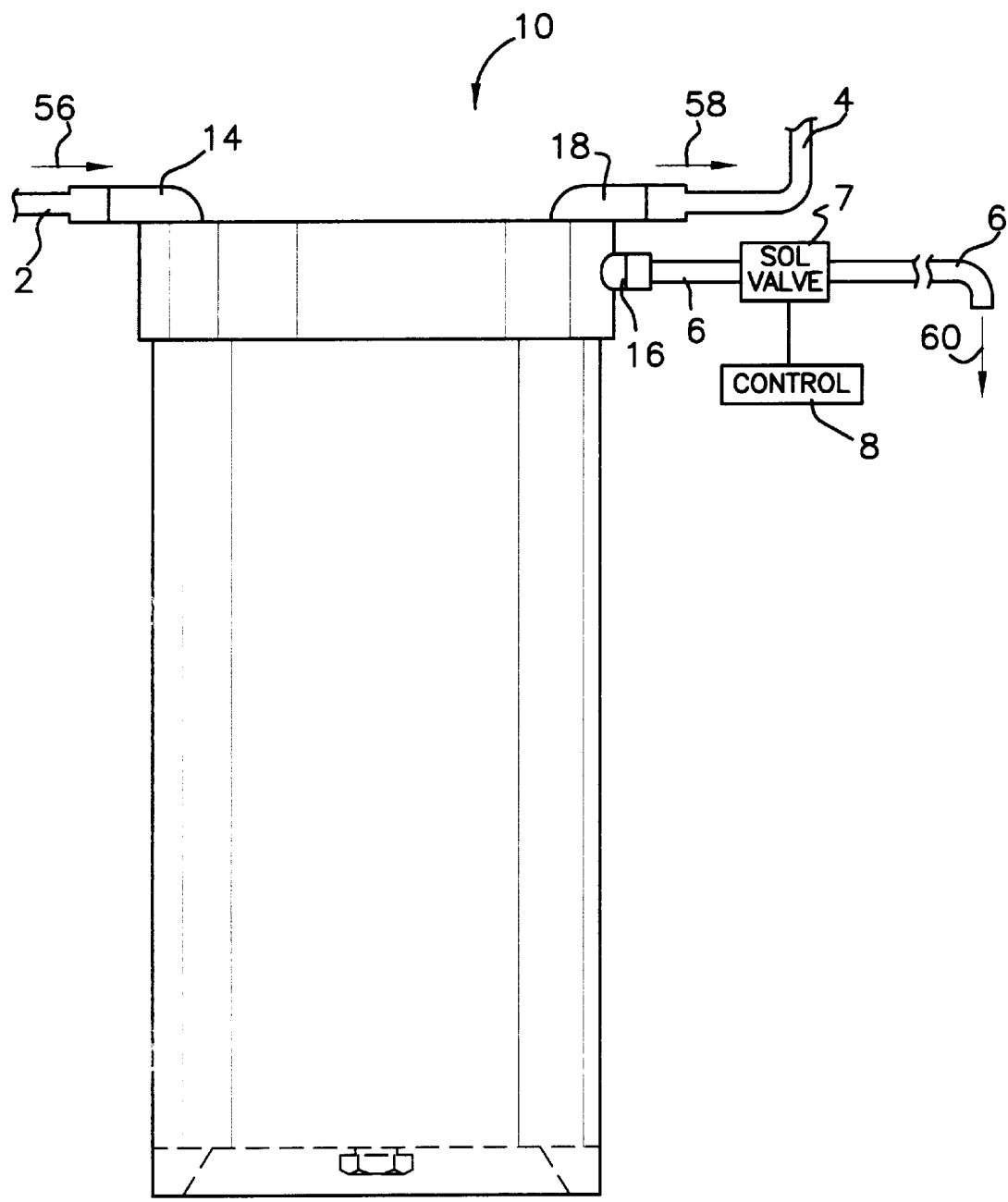
FIG. 2 is an environmental, side elevational view of the invention, with some environmental components shown diagrammatically.

FIG. 2 depicts filter housing 10 as it would be installed in a domestic plumbing system. Direction of flow of water is indicated by arrows. Incoming water flows in the direction of arrow 56. Filtered water is discharged from outlet 18 in a direction indicated by arrow 58. Flushing employs water from inlet 14, but keeps flushing water separated from filtered water. Flushing water is discharged from outlet 18 as indicated by arrow 60. Inlet 14 is connected to a supply of pressurized water, as represented by conduit 2. Outlet 18 is connected to a pipe or conduit 4 supplying spigots (not shown) and water utilizing appliances (not shown). Outlet 16 is connected to a pipe or conduit 6 arranged to discharge flushing water to a suitable drain (not shown) or other facility for disposal. Conduit 6 is controlled by a solenoid valve 7 which is, in turn, controlled by a suitable control is device 8. Control device 8 may be a time clock, a manual switch, or any other device enabling manual or automatic operation of solenoid valve 7.

Figure 3:
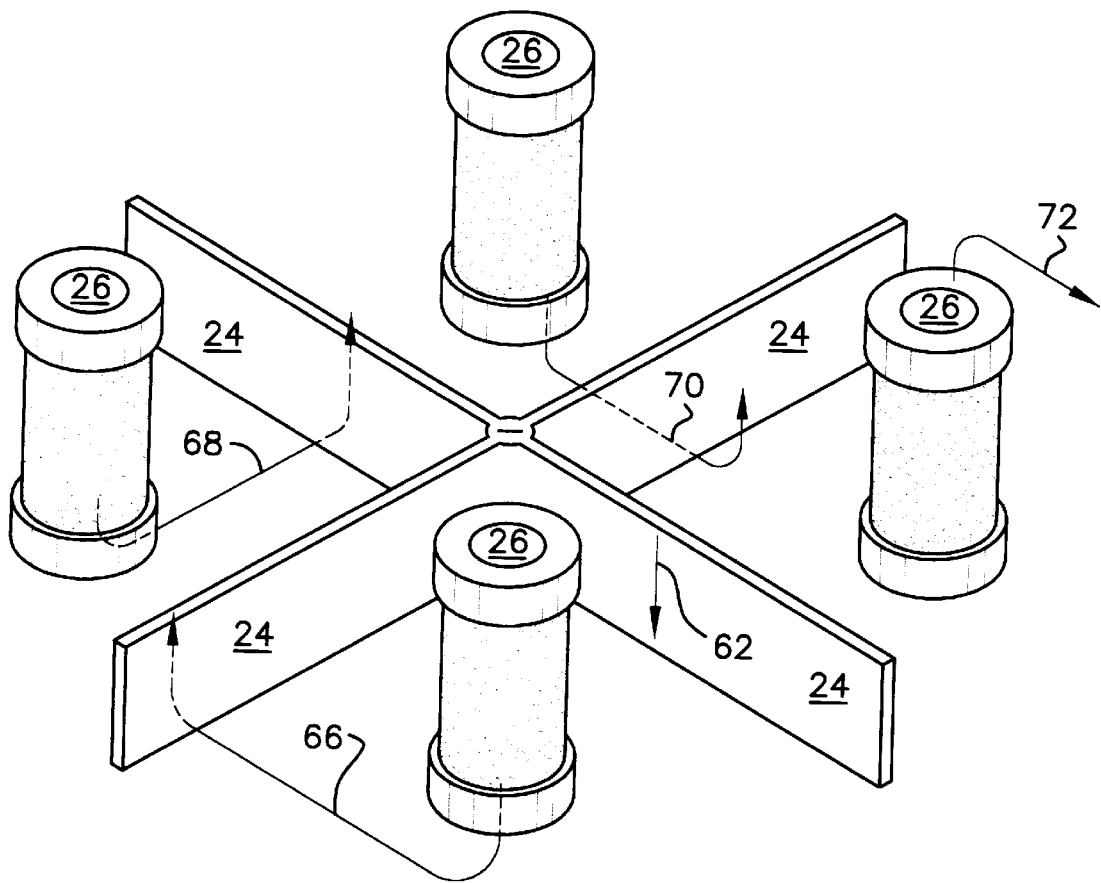
FIG. 3 is an exaggerated, diagrammatic representation of fluid circuitry of liquid being filtered.

Liquid flow through filter housing 10 is shown in simplified, diagrammatic manner in FIG. 3. Unfiltered water obtained from the domestic water supply enters one chamber 22 (see FIG. 1) from cap 12, as indicated by arrow 62. It will be recalled from FIG. 1 that chambers 22 are separated from one another by walls 24. A port 64 (see FIG. 5) admitting water is arranged to discharge this water outside the open center of the filter cartridge 26 occupying the chamber 22 receiving water. As this chamber 22 fills, pressure will urge water through the filtering element of cartridge 26 into the open center. Filtered water descends to a passage formed in the bottom of canister 20. This passage conducts water to a second chamber 22, as indicated by arrow 66. Water enters the second chamber 22 outside the open center of the second filter cartridge 26. As the second chamber 22 fills, water passes through the filtering element of the second filter cartridge 26 into the open center.

Another passage conducts water to a third chamber 22, as indicated by arrow 68, where the process of filtration and passage of water to the open center of a filter cartridge is again repeated. Water passes as shown by arrow 70 to the fourth chamber where it is once more filtered under influence of fluid pressure. However, the bottom 28 (see FIG. 1) of canister 20 is closed beneath the fourth filter cartridge 26. A passage formed in cap 12 is open to the center of the fourth filter cartridge 26, and filtered water passes to outlet 18 (see FIG. 4) through this passage, as indicated by arrow 72. In summary, filter housing 10 conducts liquid serially through the various filter elements or cartridges 26 contained within filter housing 10. Water is thereby subjected to the cumulative effect of all four filters. This may result in highly efficient or thorough filtration, if all filter cartridges 26 are of similar filtration characteristics. Alternatively, filter cartridges 26 may have different filtration characteristics. Illustratively, different contaminants could be trapped by different filter cartridges 26. Use of four different filter cartridges could be exploited to eliminate many different contaminants which could be present in unfiltered water passing through the domestic plumbing system.

Figure 4:
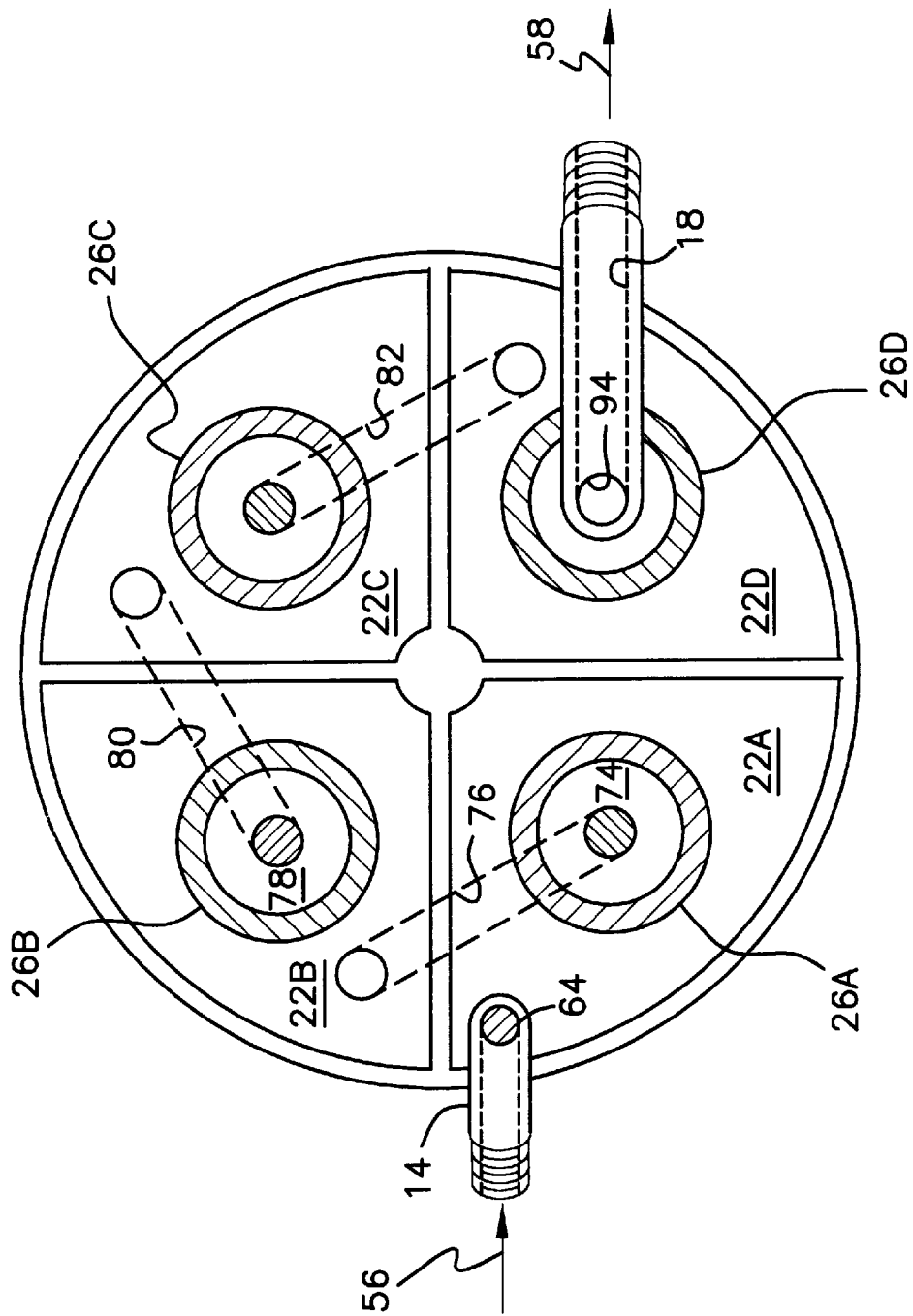
FIG. 4 is a modified plan view of the invention showing only passages introducing liquids for filtering, transferring liquids between adjacent filtering chambers, and discharging filtered liquid.

Passages formed in bottom 28 of canister 20 are illustrated in the plan view of FIG. 4. Water discharged from port 64 fills chamber 22A and open center 74 of filter cartridge 26A. This water is conducted by a canister internal passage 76 to chamber 22B. Water will fill open center 78 of filter cartridge 26B, then pass through a canister internal passage 80 to chamber 22C. Water will finally pass through a canister internal passage 82 to chamber 22D. Thus passages 76, 80, 82 each communicates between adjacent chambers 22A, 22B, 22C, 22D, transferring liquid in serial fashion from one chamber 22A, 22B, or 22C to subsequent chambers 22B, 22C, 22D. Water leaves chamber 22D through a port 94 of outlet 18.

Figure 5:
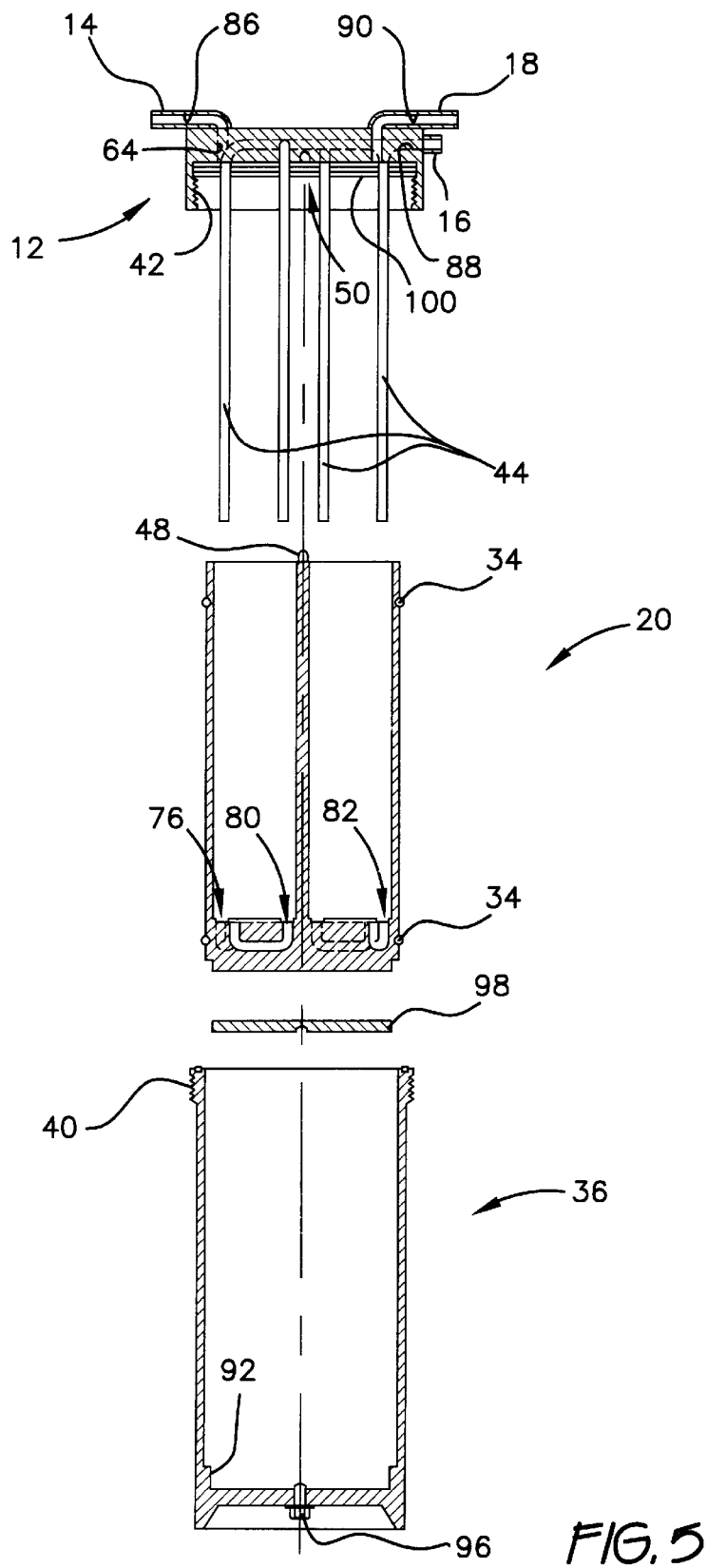
FIG. 5 is a cross sectional view of the invention.

Certain components of novel filter housing 10 have been omitted for clarity in the view of FIG. 4. FIG. 5 shows the components omitted from FIG. 4. Walls 24 and filter cartridges 26 are omitted from FIG. 5 for clarity. Pick up tubes 44 are seen to depend from bottom surface 38, there being one pick up tube 44 for each chamber 22 (see FIG. 1) of canister 20. FIG. 5 also shows internal passages formed in cap 12 and in bottom 28 of canister 20. A first cap internal passage 86 conducts incoming water into the first chamber 22A (see FIG. 4). A second cap internal passage 88 comprises a portion of the flushing circuit. A third cap internal passage 90 conducts filtered water to outlet 18. Passages 86, 88, 90 all extend from bottom surface 38 of cap 12 to their respective inlet 14, outlet 16, and outlet 18.

Thus far, the filtering circuit has been described. The filtering circuit includes first cap internal passage 86, passages 76, 80, and 82 located in bottom 28 of canister 20, and third cap internal passage 90. The flushing circuit also utilizes first cap internal passage 86 for supplying flushing water, and passages 76, 80, and 82 to transfer water sequentially to each chamber 22. Water discharged from each chamber 22, rather than being collected in third cap internal passage 90 for disposal, is instead collected in second cap internal passage 88. Water and contaminants pass upwardly through pick up tubes 44, which communicate in parallel with passage 90. Water and contaminants are finally discharged through outlet 16 without coming into contact with and subsequently fouling third cap internal passage 88.

Figure 6:
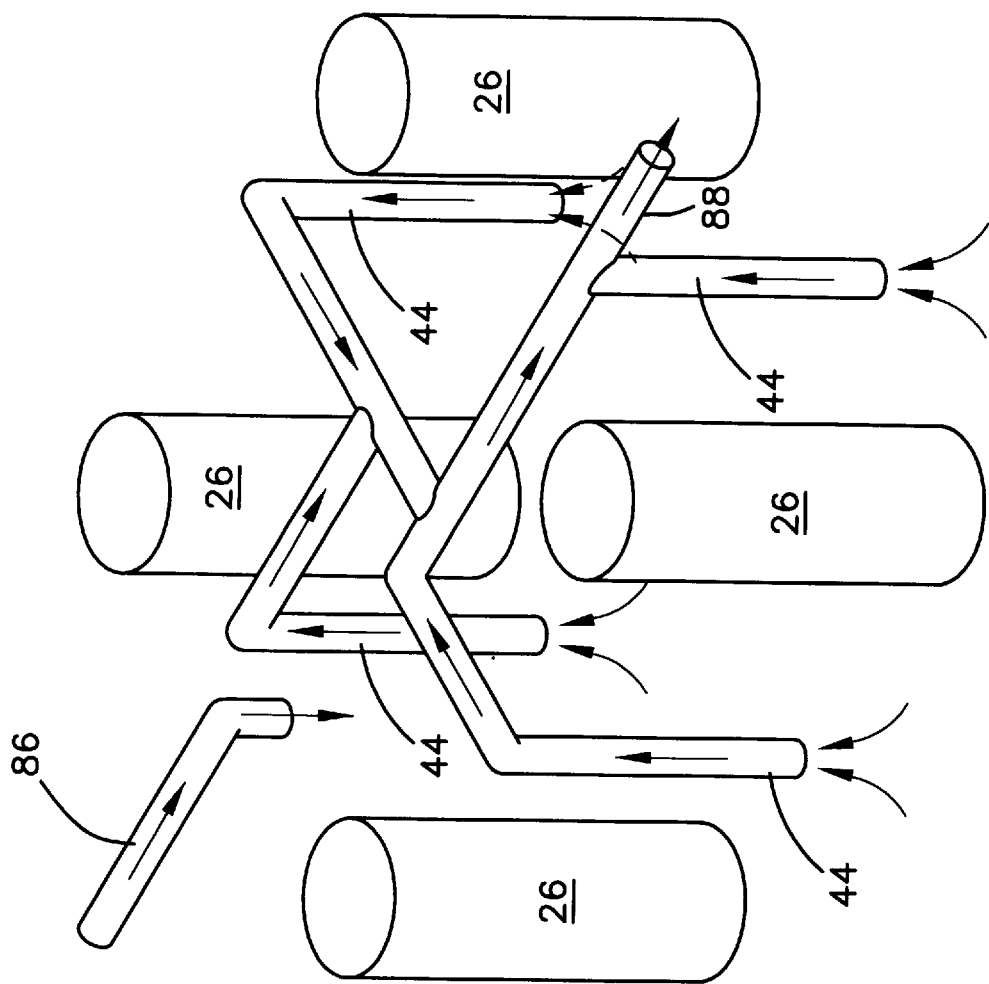
FIG. 6 is an isometric, diagrammatic representation of flushing circuitry.

The flushing circuit, although not all components of filter housing 10, is shown diagrammatically in its entirety in FIG. 6. Direction of flow is indicated by arrows (unnumbered in the view of FIG. 6). The view of FIG. 6 clearly shows collection of liquid from each chamber 22 (see FIG. 1) at the bottom of pick up tubes 44. It should be stressed at this point that nub 48 (see FIG. 1) is keyed to assure that first cap internal passage 86 is disposed in vertical registry and fluid communication with one chamber 22 (see FIG. 1) and third cap internal passage 90 is disposed in vertical registry and fluid communication with another chamber 22 when cap 12 is secured to canister 20. In particular, that chamber 22 not provided with a canister internal passage 76, 80, or 82 opening to the chamber 22 outside its respective filter cartridge 26 is disposed in vertical registry with port 64 of cap internal passage 86. Similarly, that chamber 22 not provided with a cap internal passage 76, 80, or 82 opening to the chamber 22 at the open center of its respective filter cartridge 26 is disposed in vertical registry with port 94 (see FIG. 4) of cap internal passage 90.

Figure 7:
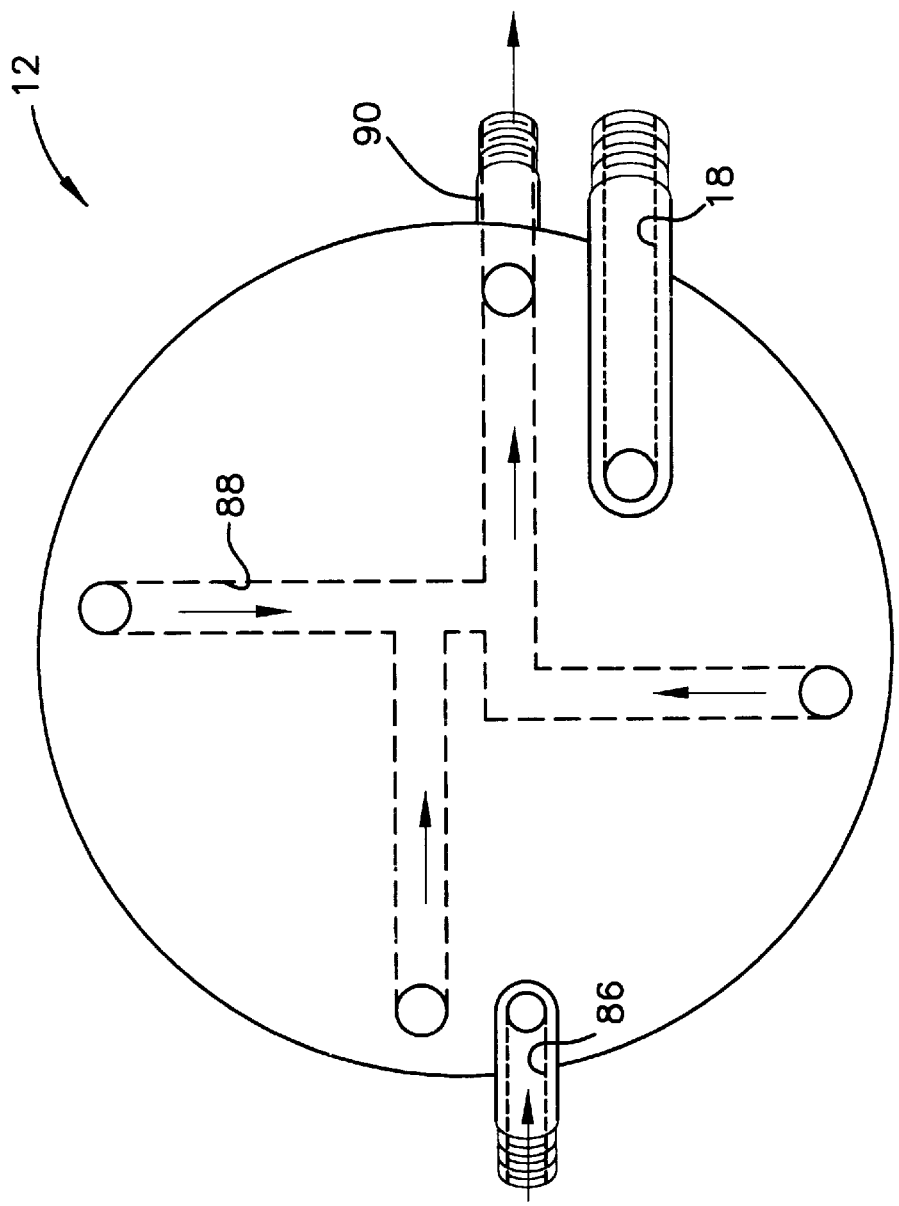
FIG. 7 is a modified top plan view of the top of the novel filter housing, wherein arrows indicate flow during flushing.

FIG. 7 shows a representative configuration of cap 12 as it relates to first, second, and third cap internal passages 86, 88, 90. Flow of the flushing circuit is shown in arrows (unnumbered in the view of FIG. 7).

Returning to FIG. 5, seating and concentric alignment of canister 20 within retainer 36 is assured by a shoulder 92, and by cooperation between nub 48 and recess 50.

FIG. 5 also shows a tightening member assuring tight abutment of individual filter cartridges 26 (see FIG. 1) against the bottom surface 38 of cap 12. A bolt 96 threads into floor 54 of retainer 36. When retainer is fully threaded against cap 12, turning bolt 96 so that it progressively and adjustably moves upwardly (towards cap 12 in the depiction of FIG. 5) will cause bolt 96 to bear against a piston 98. Piston 98 will then urge canister 12 against cap 20 responsive to this adjustment. Piston 98 is a protective member or plate slidably disposed within retainer 36 which transmits force from bolt 96 against canister 20 without allowing bolt 96 to damage canister 20. A spin plate 100 which fits against surface 38 of cap 12 provides a measure of resilience and a surface having suitable low friction characteristics to seat and seal the upper surfaces of filter cartridges 26, canister 20, and retainer 36 when tightening retainer 36 to cap 12. Spin plate 100 comprises three members, there being top and bottom layers of nylon and a center layer of metal.

The present invention is susceptible to variations and modifications which may be introduced without departing from the inventive concept. Several examples of modifications will be set forth. Filter housing 10 may be provided with any number of chambers 22 and appropriate fluid circuitry to accommodate any number of filter cartridges 26. Inlet 14 and outlets 16, 18 may be formed as female members within cap 12 rather than the male members depicted. Threads 40 and 42 joining retainer 36 to cap 12 could be replaced by screws (not shown), latching arms (not shown), or other fastening elements which could serve in their place.

It is to be understood that the present invention is not limited to the embodiments described above, but encompasses any and all embodiments within the scope of the following claims.

We claim:

1. A multi-element filter system for conducting a liquid through filter elements contained within said filter system, comprising:

a plurality of filter elements;

a cap having an inlet, a first outlet for discharging flushing liquid and a second outlet for discharging filtered liquid, a bottom surface, a first cap internal passage extending from said inlet to said bottom surface, a second cap internal passage extending from said first outlet to said bottom surface, and a third cap internal passage extending from said second outlet to said bottom surface;

a canister having a solid bottom, a peripheral wall, an open top positioned against the bottom surface of said cap, a plurality of internal walls dividing said canister into a plurality of separated chambers, each of said chambers containing one of said filter elements, and a plurality of canister internal passages disposed within said solid bottom of said canister, each of said canister internal passages communicating between two of said chambers, wherein said cap further comprises a plurality of pick up tubes depending from said bottom surface wherein each of said pick up tubes is configured and located to project into one of said chambers of said canister within said chambers and outside said filter elements, and wherein each of said pick up tubes communicates with said second cap internal passage and extends to said first outlet of said cap to establish a flushing circuit, and said filter system has a filtering circuit extending serially from said inlet through said first cap internal passage through each of said chambers via each of said canister internal passages and through said third cap internal passage to said second outlet of said cap; and a retainer surrounding said canister, disposed to hold the open top of said canister against said bottom surface of said cap, said retainer having threaded fastening elements securing said retainer to said cap such that tightening said retainer to said cap compresses said canister against said cap.

2. The multi-element filter system according to claim 1, further comprising a keying element disposed to entirely constrain said canister and said cap against mutual rotation.

3. The multi-element filter system according to claim 1, wherein said retainer has a continuous annular wall and a continuous floor, and surrounds and seals said canister between said cap and said retainer when said retainer fully engages said cap.

4. The multi-element filter system according to claim 1, wherein said pick up tubes are each dimensioned and configured to terminate proximate said bottom of said canister when said canister abuts said cap.

5. The multi-element filter system according to claim 1, further comprising a spin plate disposed between said cap and said canister, said spin plate having a lower surface of low friction characteristics and providing resilience, for enabling said canister, said retainer, and filter cartridges which may be installed within said multi-element filter system to seat and seal relative to said cap.

* * * * *